Patented Feb. 24, 1925.

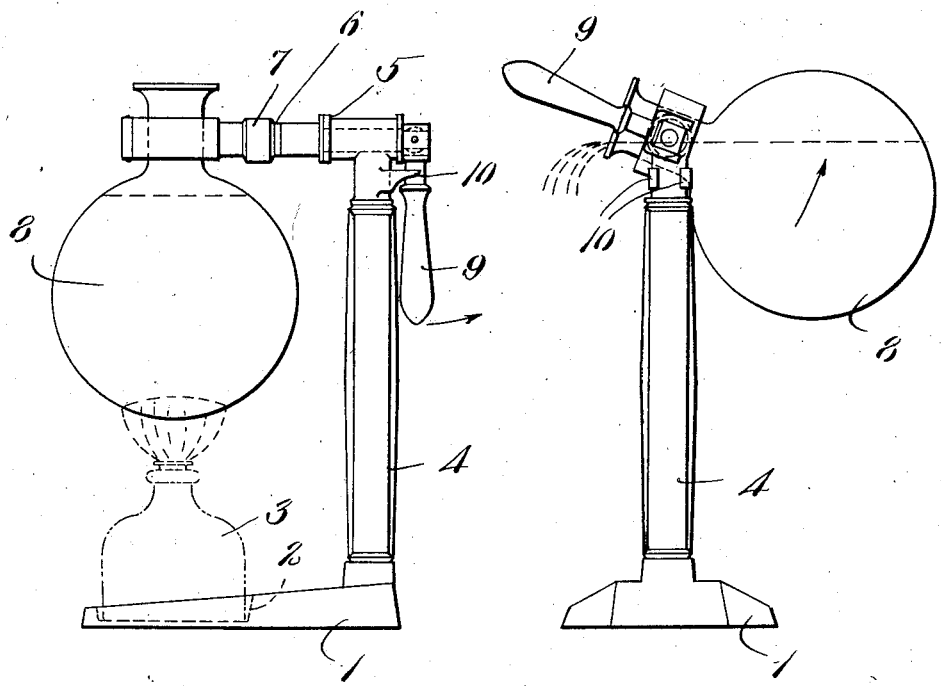

1,527,962

UNITED STATES PATENT OFFICE.

WILLIAM A. LAMB, OF EVERETT, MASSACHUSETTS, ASSIGNOR, BY MESNE ASSIGNMENTS, TO SILEX COMPANY, OF MALDEN, MASSACHUSETTS, A CORPORATION OF CONNECTICUT.

COFFEE-MAKING MACHINE.

Application filed September 25, 1923. Serial No. 664,776.

*To all whom it may concern:*

Be it known that I, WILLIAM A. LAMB, a citizen of the United States, and resident of Everett, in the county of Middlesex and State of Massachusetts, have invented an Improvement in Coffee-Making Machines, of which the following description, in connection with the accompanying drawings, is a specification, like letters on the drawings representing like parts.

The present invention relates to coffee making machines, and more particularly to coffee making machines of the filter type.

These machines usually comprise a base for a heating medium, a single vertical column carried by the base, and a glass container supported from the column in position for the action of the heating medium. In one commercial type of these machines the device, by means of which the container is supported from the column is provided with a handle so that the container may be lifted from the column and the made coffee in the container poured into a cup. The lifting of the container from the column and the subsequent pouring of the contents of the container into a cup subjects the wrist of the user to the entire weight of the container which creates a twisting strain on the wrist during the pouring operation. Experience has demonstrated that this twisting strain is an annoying feature in the use of coffee making machines.

The object of the present invention is to produce a coffee making machine having a container from which the contents may be poured in a satisfactory manner, as fully set forth in my prior abandoned application, Serial No. 180,099, filed July 12, 1917, and allowed January 8, 1921, which application was forfeited for non-payment of final fee.

To the accomplishment of this object a feature of the present invention contemplates the provision, in a coffee making machine having a base for a heating medium and a single vertical column carried by the base, of a container supported from the column in position for the action of the heating medium movable about a fixed axis to pour the contents of the container.

With this construction the container may be turned about the fixed axis in a most convenient manner to pour the contents therefrom without subjecting the user to the duty of handling a heavy object and turning that heavy object through a twist of the wrist.

Broadly considered the container may be supported from the single vertical column in any suitable manner found desirable or expedient. It is preferred, however, to support the container on a horizontal shaft journaled on the column and to provide means for normally preventing the rotation of the shaft in its journal. This means may conveniently take the form of a pair of co-operating devices, one of which is mounted on the shaft and the other one of which is mounted on the column. One of these devices may, after its separation from the other device, serve as a handle for rotating the shaft to pour the contents of the container.

Figure 1 shows the container in the position when the coffee is being heated, and Figure 2 when the prepared coffee is ready to be poured.

In the illustrated embodiment of the invention the coffee making machine comprises a base 1 provided with a depression 2 in which a heating medium 3 is seated. Rising from the base 1 is a single vertical column 4 which is provided at its upper end with a journal 5 for a horizontal shaft 6 rotatably mounted therein. The shaft 6 carries at one end a readily separable clamp 7 for supporting a container 8 forming the lower part of a coffee making machine of a well known type.

In order to normally hold the shaft 5 in a fixed position to subject the container 8 to the heat of the heating medium, the end of the shaft 6 opposite the clamp 7 is provided with a pivoted handle 9 the shank of which may be wedged between a pair of lugs 10 on the column 4.

In order to pour the contents of the container, the handle 9 is swung away from the lugs 10 and positioned above the shaft 6 in the manner illustrated in Fig. 2. Then a slight pressure on the handle, drawing towards the user, turns the shaft 6 in its journal, thus positioning the container for the contents thereof to pour therefrom.

While the container has been described as forming part of a coffee making machine, it will be readily understood by those skilled in the art that the container may be used alone for the purpose of boiling or heating other beverages than coffee.

My invention is further described and defined in the form of claim as follows:

A coffee making machine, having, in combination, a base for supporting a heating medium, a column rising from said base, a horizontal shaft supported in bearings on said column, a container supported by said shaft in position to be heated by said heating medium, a pair of lugs projecting rearwardly from said column, and a handle pivoted on said horizontal shaft whereby said handle may be swung downwardly into a position substantially parallel to said column and between said lugs to lock said shaft against rotation, or released from said lugs and used to rotate said shaft to pour out the contents of said container.

In testimony whereof I have signed my name to this specification.

WILLIAM A. LAMB